United States Patent
Cheo

[19]

[11] Patent Number: 6,031,850
[45] Date of Patent: Feb. 29, 2000

[54] CLAD PUMPED, EYE-SAFE AND MULTI-CORE PHASE-LOCKED FIBER LASERS

[75] Inventor: Peter K. Cheo, Waterford, Conn.

[73] Assignee: PC Photonics Corporation, Waterford, Conn.

[21] Appl. No.: 09/265,251

[22] Filed: Mar. 9, 1999

Related U.S. Application Data

[63] Continuation-in-part of application No. 08/995,479, Dec. 22, 1997, abandoned.

[51] Int. Cl.[7] .................................................. H01S 3/07
[52] U.S. Cl. ................................ 372/6; 65/477; 372/68
[58] Field of Search ............................ 372/6, 66, 68, 372/70, 71; 65/381, 475, 477

[56] References Cited

U.S. PATENT DOCUMENTS

| | | | |
|---|---|---|---|
| 5,268,978 | 12/1993 | Po et al. | 372/6 X |
| 5,299,210 | 3/1994 | Snitzer et al. | 372/6 |
| 5,309,452 | 5/1994 | Ohishi et al. | 372/6 |
| 5,473,622 | 12/1995 | Grubb | 372/6 |
| 5,530,709 | 6/1996 | Waarts et al. | 372/6 |
| 5,530,710 | 6/1996 | Grubb | 372/6 |
| 5,533,163 | 7/1996 | Muendel | 372/6 X |
| 5,566,196 | 10/1996 | Scifres | 372/6 |

*Primary Examiner*—John D. Lee
*Attorney, Agent, or Firm*—M. P. Williams

[57] ABSTRACT

A fiber laser 10 with square inner cladding 12, 29 may have a single core 11 codoped either with Ytterbium or Erbium or with Thulium and Holmium at a ratio of at least 10:1 operating in a single mode to provide eye-safe radiation with wavelengths above 1.5 micron. The single core laser has a pump clad cross sectional area about $2(10)^3$ greater than the cross sectional area of the core. A multi-core laser has a plurality of single mode cores 28 doped with any rare earth ions, the cores equally spaced by at least two core diameters in an isometric array, in a cavity having a finesse of greater than ten, to produce a single, very bright phase-locked beam in the fundamental supermode. A method starts with hexagonal cladded-core rods 35, 36 in an isometric array, which are then fused and drawn down.

20 Claims, 3 Drawing Sheets

CLAD PUMPED, EYE-SAFE AND MULTI-CORE PHASE-LOCKED FIBER LASERS

CROSS REFERENCE TO RELATED APPLICATIONS

This application is a continuation-in-part of U.S. patent application Ser. No. 08/995,479, filed Dec. 22, 1997 (now abandoned).

The government of the United States has rights to this invention under contract F29601-97-C-0060 with the Department of the Air Force.

TECHNICAL FIELD

This invention relates to high power, clad-pumped fiber laser emitting high-brightness beams of eye-safe wavelengths in the near infrared, employing cores codoped with Erbium paired with Ytterbium or Holmium paired with Thulium and phase-locked multi-core fiber laser.

BACKGROUND ART

There are many applications for high power, eye-safe lasers in communications, industrial material processing, remote-sensing and medical/dental surgery. In U.S. Pat. Nos. 5,299,210 and 5,566,196, clad-pumped fiber lasers use rare earth ions as the lasing medium, at wavelengths below 1.5 $\mu$m. However, fiber lasers emitting wavelengths above 1.5 $\mu$m are limited to less than a few milliwats. Additionally, with Er and Ho ions, which have eye-safe wavelengths above 1.5 $\mu$m, lasing occurs between a first excited state and the ground state; therefore, lasing cannot be sustained unless the cavity loss due to the ground state absorption at the lasing wavelength is offset by the gain of the system.

It has been shown that the ground state Er ions can be energized indirectly by utilizing Ytterbium (Yb) as a stimulating codopant, with an appropriate concentration ratio (up to about 12:1) in comparison with the concentration of Er. The higher the codoping ratio, the greater the absorption and therefore the shorter the length of fiber. See, for instance, Townsend et al, $YB^{3+}$ Sensitized $ER^{3+}$ doped Silica Optical Fiber With Ultrahigh Frequency and Gain, Elec. Lett., Oct. 10, 1991, pp. 1968–1969, and Kringlebotn et al, Highly Efficient, Low-noise Grating-feedback $ER^{3+}$: $YB^{3+}$ Codoped Fiber Laser, Elect. Lett., Jun. 9, 1994, pp. 972–973. While codoping may increase the effective pumping rate of the ground state of $ER^{3+}$ to the upper laser level—by as much as fifty times—the enhancement of pumping decreases rapidly with increasing pumping power. See, for instance, Ding and Cheo, Effects of Yb: Er-Codoping on Suppressing Self-Pulsing In Er-Doped Fiber Lasers, IEEE Photon. Tech. Lett. Mar. 3, 1997, pp. 324–326. For these reasons, high power fiber lasers emitting at eye-safe wavelengths have heretofore not been successful.

Attempts to increase clad pumped fiber laser power have included the use of multiple cores. However, the output power is usually either incoherent or in multiple beam spots (commonly referred to as "higher-order supermodes").

Another problem with clad-pumped fiber lasers is that the same energy that eventually is to be absorbed in the core so as to pump the lasing medium is traveling a great distance within the cladding, which can also absorb that energy significantly as the length of the fiber becomes too long. Therefore, while increasing the length of the laser fiber will increase the exposure of the core to the energy to be absorbed by the core and therefore increase the transfer efficiency, it also increases the amount of energy absorbed in the cladding, by some efficiency ratio. Thus, although lasers formed in coils of lengths in the kilometer regime have been known, they are not very efficient.

In the prior art of clad-pumped lasers, it is common to use a single mirror at the pump-input end of the fiber, and use of a second mirror or a cleaved fiber end as a mirror at the output end, if any, is confined to reflection of the pump laser wavelength, being nearly invisible to the laser output wavelengths.

DISCLOSURE OF INVENTION

A principal object of the present invention is provision of high power, eye-safe, clad-pumped fiber lasers. Other objects of the invention include phase-locked, multi-core, clad-pumped, fiber laser emitting the fundamental, in-phase supermode with its entire power confined in a single, high-brightness beam spot, and improvements in high power, co-doped, rare earth ion clad-pumped fiber lasers.

This invention is predicated on my discovery that various features of clad-pumped, codoped, single and multi-core lasers known to the prior art are not effective in producing high power, eye-safe lasers without incorporating additional features which are necessary. One predication is that while high pumping power is necessary, high power density in the core must be avoided to prevent saturation of the stimulating ions, which can rapidly eliminate the beneficial effect of codoping. Another predication is that multi-core clad-pumped lasers are incapable of creating phaselock beams of approximate equal intensity thereby to produce a single, high brightness output beam in the fundamental supermode, unless the cores are all capable of equal excitation from the pump power within the cladding. A further predication is that a single, high brightness output beam in the fundamental supermode cannot be achieved with multi-core lasers known to the prior art since it is essential to provide a cavity finesse in excess of ten to confine the radiation in the cores within a narrow range of frequencies in order to achieve necessary phase locking.

According to a first aspect of the present invention, a clad-pumped fiber laser having a single core codoped with either Ytterbium and Erbium or Thulium and Holmium in a ratio of 12:1 or more, produces tens of watts of output power at about 1.5 $\mu$m or 2.0 $\mu$m, respectively. In further accord with this aspect of the invention, maximum effective pumping rate of the ground state of the lasing ions (either Erbium or Holmium) is achieved by avoiding saturation of the stimulating ions (either Ytterbium or Thulium, respectively); the high pump power propagating in the pump cladding is distributed into the core incrementally, at very low power densities, over a very long path (e.g., on the order of twenty-five meters); this effect is caused by pump cladding which is up to ten times larger than that of the prior art, the ratio of the cross sectional area of the pump cladding to the cross sectional area of the core being in a range of about $10^3$ to $10^4$. In accordance with the invention further, the laser is tuned to emit radiation for which the cross section of emission is between 1.4 and 1.5 the cross section of absorption.

According to another aspect of the present invention, a clad pumped laser comprises an isometric matrix of doped cores equally spaced with one another by a center-to-center distance of not less than two core diameters, within a common inner, pump cladding and mirrors forming a cavity with a finesse of at least ten, providing a single, phase-locked high-brightness output beam in the fundamental supermode. According further to this aspect of the invention, fusion of a plurality of hexagon clad core rods form a preform which is drawn down to an extremely small cross section and extremely great length, to provide a multicore laser fiber having the aforementioned dimensions. The high brilliance is enhanced by the number of cores in the laser, and the laser may be shorter by that number of cores.

Other objects, features and advantages of the present invention will become more apparent in the light of the following detailed description of exemplary embodiments thereof, as illustrated in the accompanying drawing.

BEST MODE FOR CARRYING OUT THE INVENTION

Figure 1:
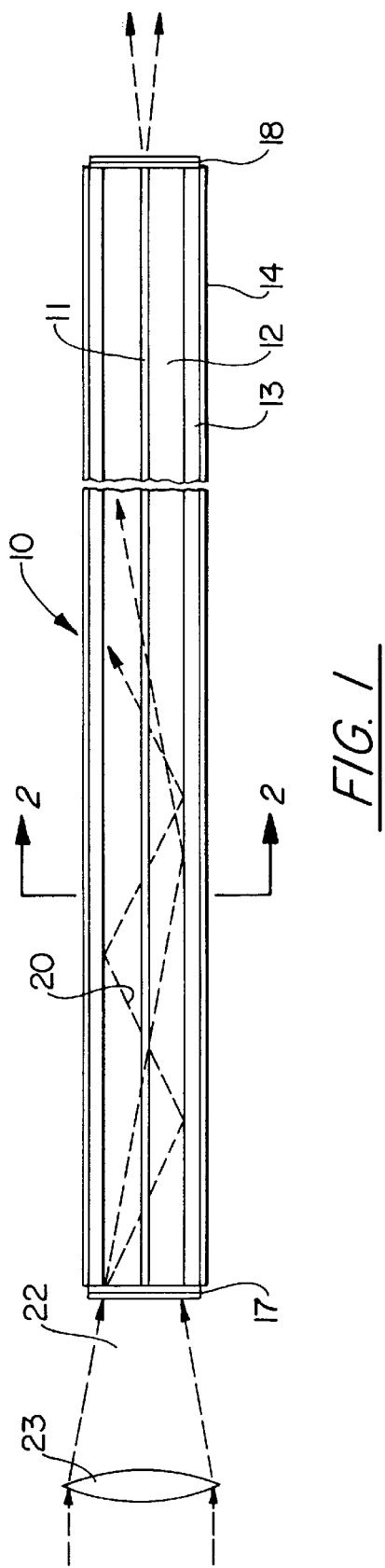
FIG. 1 is a sectioned, side elevation view of a fiber laser, with the various parts not to any common scale, and with sectioning lines omitted for clarity.
Figure 2:
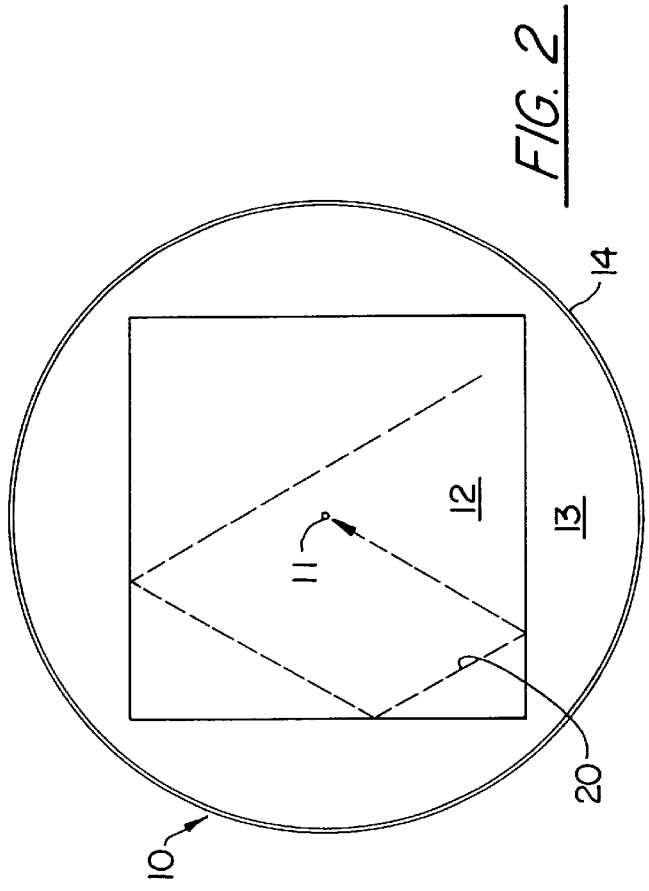
FIG. 2 is a section taken on the line 2—2 of FIG. 1, illustrating the components of the laser more nearly to a correct common scale, with sectioning lines omitted for clarity.

Referring to FIG. 1, a fiber laser 10 comprises a codoped fiber core 11 surrounded by an inner cladding 12, an outer cladding 13 and a protective coating 14. A pair of mirrors 17, 18 disposed at opposite ends of the laser form the laser cavity. In the examples herein, the mirrors 17, 18 may be formed either of dichroic thin film materials or fiber Bragg gratings, with suitable reflectivity and transmissivity, as is known in the art. The core 11 may be on the order of 7 microns in diameter, suitably doped, such as with a pair of rare earth dopants as described hereinafter. The inner cladding 12 may be lightly doped, communication grade silica or quartz having a lower index of refraction than the core, with a numerical aperture of between 0.10 and 0.17 for the core/inner cladding interface. This assures a single mode of oscillation in the core. The outer cladding 13 serves to create a multimode waveguide of the inner cladding by having a much higher numerical aperture, such as about 0.4 or 0.5, at the interface between the inner and outer cladding. A large numerical value is desirable to capture the pump radiation within the inner cladding, as is illustrated by the radiation 20 shown in dotted lines in FIGS. 1 and 2. The core may be on the order of 7 microns in diameter. According to the invention, the cross sectional area of the inner cladding 12 is very much larger than the cross sectional area of the core 11, such as between $10^3$ and $10^4$ times the core area, and may be on the order of 300 microns square. This is to provide a sufficient window at the mirror 17 to end-feed the pump energy 22 which is focused thereon by a lens 23, from a suitable source such as an array of diodes (as is known, not shown) to provide high power in the cladding without having too high a power density in the core, so that power will be absorbed by the core over a large distance, rather than all at once. This avoids saturating the stimulating ions (either Ytterbium or Thulium) in the core.

In accordance with the invention, Erbium codoped with Ytterbium will emit laser radiation at wavelengths between 1.5 and 1.6 microns, and Holmium codoped with Thulium will emit laser radiation at wavelengths between 2.0 and 2.1 microns. As is known, to achieve single mode operation, a single mode fiber laser must have a V-value which is not greater than 2.405. With a laser tuned to 1.56 microns or higher, and a core of seven microns diameter, a numerical aperture of 0.17 is required at the interface of the core and the inner cladding, which is easily achieved. If the numerical aperture is increased due to an increased doping ratio, the core diameter must be decreased accordingly in order to keep the V-value under 2.405.

Although the laser is shown in FIG. 1 extending linearly, and of indefinite length, clad-pumped lasers are typically extremely long, usually in excess of 10 meters. The lasers are rendered workable by being formed into coils. Because the ratio of the cross sectional area of the core to the cross section area of the inner cladding is very small (about $10^{-3}$) the lasing wavelength should be selected to maximize absorption of the pump wavelength while being off the peak absorption wavelength; a preferred lasing wavelength is one chosen to result in the ratio of emission cross section to absorption cross section, at that wavelength, to be between 1.4 and 1.5. The pump power is gradually transferred from the inner cladding to the core as the pump radiation is propagating along the fiber, thereby avoiding saturation of the stimulating ions. As is known, the geometry of the inner cladding is significant in providing adequate core absorption efficiency. Although a non-square rectangular cross section may give the greatest efficiency, a square cross section is nearly as efficient and is much cheaper because fabricating the square configuration from a cylindrical preform results in less waste of precious cladding material. However, the cross sectional shape of the pump cladding may have the shape of other regular or irregular polygons. The core pump absorption efficiency for a single codoped fiber with a square or rectangular inner cladding reaches nearly 100 percent for a fiber length of 50 meters in a single pass (with no return mirror).

According to the present invention, the core 11 is doped to a concentration of $3.4 \times 10^{19}$ per cubic centimeter of Erbium or Holmium, which is 0.4 weight percent, and $4 \times 10^{20}$ per cubic centimeter of Ytterbium or Thulium, respectively, which is 5.0 weight percent. This provides a Yb to Er or Tm to Ho ion concentration ratio of about 12:1, which is within a range of between 10:1 and 15:1 which is effective in providing sufficient gain for high powered lasing of the Er ions, provided that saturation is avoided. Utilizing Yb codoped with Er at a ratio of 15:1 in a 25 meter long fiber laser core, of seven micron diameter, surrounded by a 0.3 mm×0.3 mm square inner cladding in the present invention, has provided an output power at an eye-safe wavelength of 1.6 microns, in the fundamental mode, in excess of 10 watts, with a slope efficiency (output power over input power) greater than 40%, even without optimizing all laser parameters. This is scalable for any desired dimensions.

A second aspect of the present invention is the provision of a multi-core, common clad fiber laser to achieve significantly greater output power. According to the invention, having a multi-core fiber laser in which the cores share a common inner cladding, with an equal distance between all cores which is not less than the diameter of each core, permits the pump power to reach the inner cores while retaining sufficient coupling strength between adjacent cores so as to be combined coherently with a unit phase. Because the power of a single-mode fiber laser extends far beyond the geometric boundary of the core, a very strong evanescent-wave coupling will occur through very low-loss inner cladding material, which enhances the ability to phase lock the energy in all the cores. If the individual cores are aligned orthogonally, such that the distance between cores within the same row and column are the same, but the distance between cores in adjacent rows and columns is larger than that, the phase of radiation in one core can be 180° out of phase with the radiation in all adjacent cores, leading to a higher order supermode. See, for instance, Orenstein, et al, Large Two-Dimensional Arrays of Phase-Locked Vertical Cavity Surface Emitting Lasers, Appl. Phys. Lett, Mar. 30, 1998, pp. 1535–1537. Phase locking into the fundamental, in-phase supermode is more likely to occur with equi-spacing of the cores.

Figure 3:
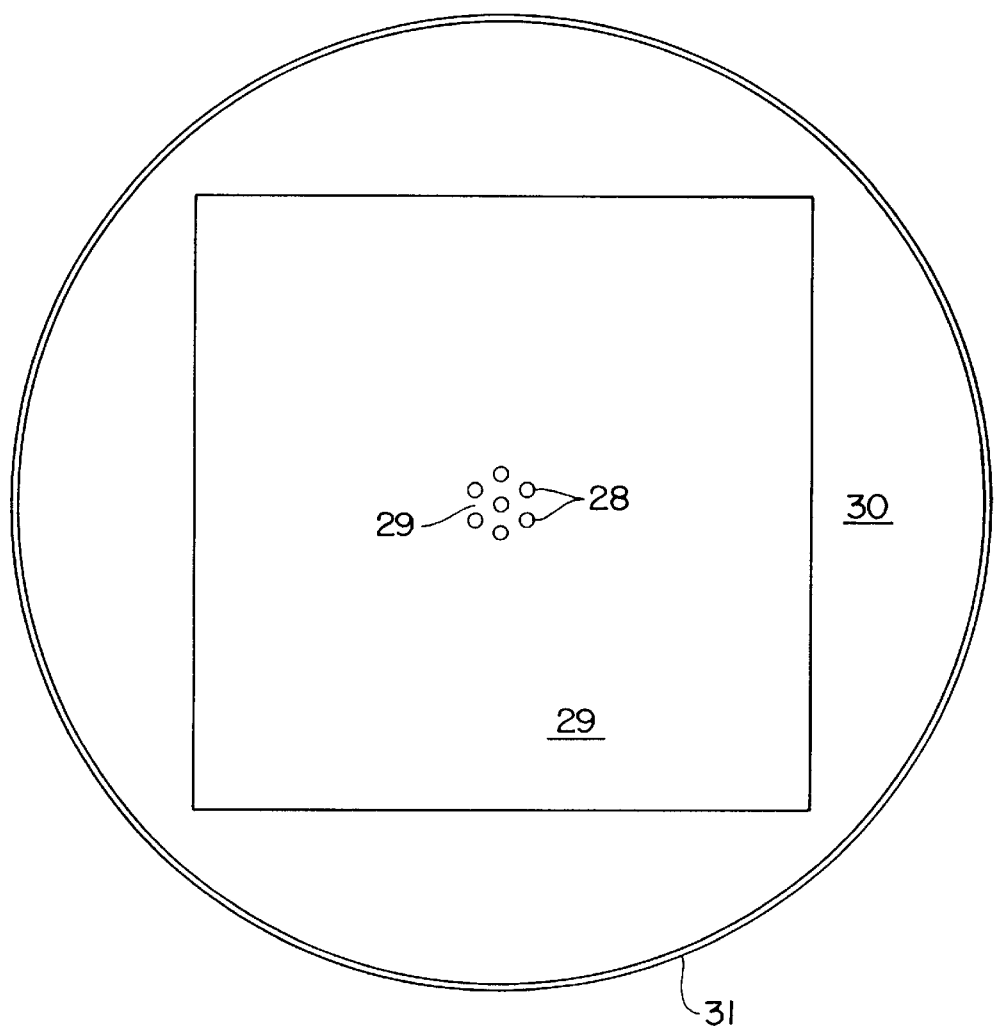
FIG. 3 is a partially broken away, sectional, end elevation view of a multi-core, common clad fiber for a clad-pumped fiber laser, with sectioning lines omitted for clarity.

In FIG. 3, a multi-core laser comprises an isometric matrix of seven cores 28, each having a diameter of seven microns, with the distance between each core and each adjacent core in any direction being the same throughout the matrix. The center-to-center distance between the cores 28 is about two core diameters, which in this example is about fourteen microns. Each core 28 may be codoped as described hereinbefore, or it may be doped with a single rare earth ion, in a conventional way. The interstices between the cores, as well as the area surrounding the cores comprises pump cladding 29 of the type described hereinbefore. The pump cladding has a square cross sectional area, which in this example is about 300 microns by 300 microns, but it could be any regular or irregular polygon. A low-index, outer cladding material 30 surrounds the pump cladding 29, and a carbon black polymer coating 31 protects the fiber, as is known. A 15 meter long multicore laser having seven, seven micron cores doped with Ytterbium, within a 300 micron square pump cladding produced a very bright, phase-locked single beam in the fundamental supermode.

Figure 4:
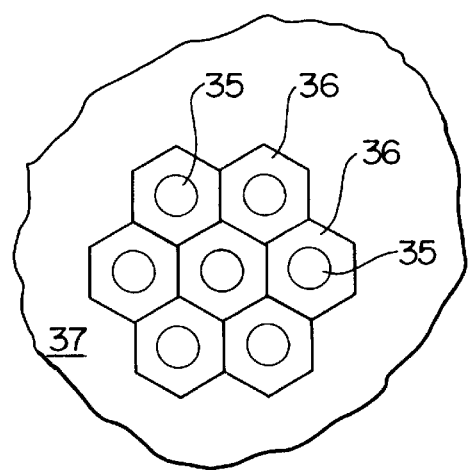
FIG. 4 is a sectioned, end elevation view of a one ring, seven core, clad fiber laser core preform of the invention.

A preferred method for forming the multi-core clad pumped fiber laser of FIG. 3 is partially illustrated in FIG. 4. Initially, a single cladded rod, consisting of rare earth doped core material described hereinbefore surrounded by an ample amount of pump cladding described hereinbefore is machined into a hexagonal shape, and then cut into shorter pieces. The short pieces are arranged isometrically as illustrated in FIG. 4 and then fused together to form a single, seven-core matrix, surrounded by a small amount of pump cladding material. Then, a very thick layer of cladding material 37 is deposited over the fused matrix, and the cladding wall is then precision-machined to a square shape as shown in FIG. 3. Then a very low-index outer cladding material 30 is extruded onto the square preform to provide a very high numerical aperture value for a maximum coupling of the pump laser energy into the inner cladding. A conventional protective carbon black polymer 31 is then coated onto the outer wall. The multi-core fiber is next drawn down from this preform in the usual way, being reduced from a cross section on the order of 5.0 centimeters diameter to a cross section just under 500 microns diameter. The resulting laser fiber is then incorporated into an operating laser with mirrors, lenses, and a pump diode array, all as is known.

Figure 5:
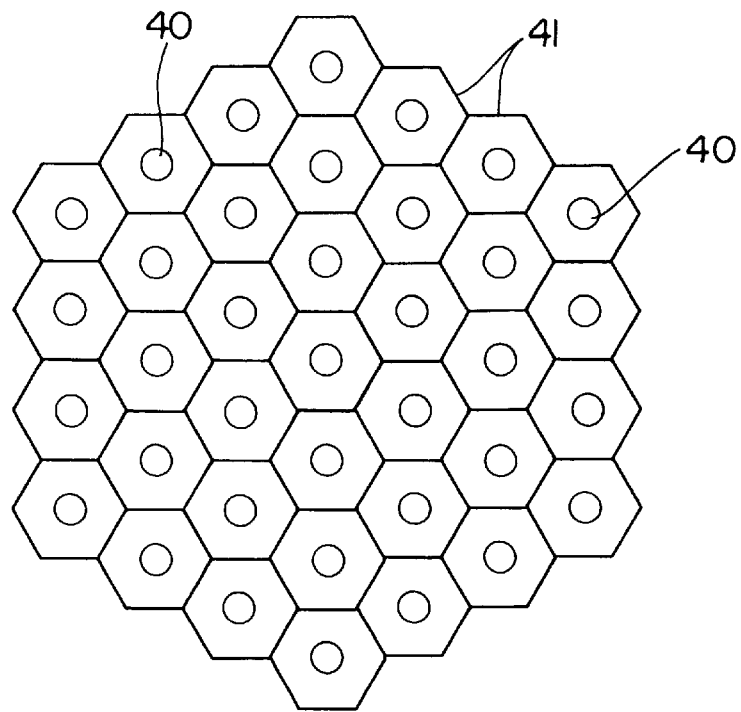
FIG. 5 is a sectioned, end elevation view of a three ring, thirty-seven core, clad fiber laser core preform of the invention.
Figures 6, 7:
FIG. 6 illustrates the high-brightness central beam of the fundamental supermode achieved by the present invention.
FIG. 7 is an illustration of a radiation pattern which may result from a higher order supermode, which will occur in multi-core lasers of the prior art.

Another aspect of the present invention is illustrated in FIG. 5. Therein, the cores 40, each surrounded by hexagonal inner clad material 41, as described hereinbefore, are arranged in an isometric matrix having three rings and 37 cores. However, the diameter of the cores 40 is reduced in order to ensure that there are adequate pathways for pump radiation to reach the cores on the inside of the matrix to provide nearly uniform gain among the cores. This is an important aspect of the invention in providing not only adequate absorption of the pump radiation by the cores, but providing a clear passage directly into cores, rather than having the outer cores becoming saturated with too much radiation, with very little or none reaching the inner cores, as in the prior art. In the example of FIG. 5, the ultimate, post-drawing, flat-to-flat dimension of the cladding material 41 is about the same as in the embodiment of FIG. 4, (about fourteen microns) but the diameter of the cores 40 in FIG. 5 is somewhat less than the diameter of the cores 35 in FIG. 4.

The use of multiple cores reduces the length of fiber required for an absorption coefficient approaching 100% typically by the same fraction as the number of cores. Instead of the usual 50 meters, 100% core absorption can be achieved in a length on the order of seven meters in the seven-core, phase-locked examples of FIG. 3 and 4, and in a length on the order of 1.4 meters with a 37-core phase locked array as in FIG. 5. Thus, increased power is achieved with significantly reduced length.

Although the use of an isometric core matrix configuration with adequate spacing between cores is a requirement for obtaining the in-phase, fundamental supermode, it is not sufficient unless the frequencies of all the fiber lasers in the matrix are within a narrow locking half-width, $\Delta\omega_{lock}$, which is basically determined by $$\Delta\omega_{lock} = 2KM[1+(\Delta\alpha/2)^2]^{1/2}$$

where K is the evanescent-wave coupling coefficient between two adjacent cores, M is the longitudinal mode spacing, and $\Delta\alpha$ is the difference in line width enhancement factor between the two adjacent lasers. In the case of optically pumped fiber lasers, $\Delta\alpha$ is usually very small and can be ignored; with this approximation, $\Delta\omega_{lock}$ is 2 KM. For the case of an intermediate coupling strength of 0.05 and a fiber laser length of 2.0 meters, $\Delta\omega_{lock} \approx 5$ MHz.

Assuring that the laser is stable within this locking range requires a laser cavity having a relatively high-finesse, in excess of ten.

The invention may also be practiced by providing many more cores in the multi-core fiber laser. For instance, instead of 37 cores as shown in FIG. 5 herein, the laser may be formed with on the order of several hundred, more or less, equispaced cores in an array which will occupy nearly the entire volume of the inner cladding. The number of cores is limited mainly by the flexibility of the fiber, as well as the uniformity of pump power distribution which can be achieved. However, the cores should not be less than three microns nor more than eight microns in diameter. In this case, the outer periphery of the additional inner cladding may be circular because all skew rays propagating in a circular cladding will be absorbed by the cores. With a phase locked array having a few hundred cores, the fiber length for full core absorption is reduced to less than ten centimeters. Therefore, it is possible to simplify the manufacturing process by reducing the ratio of Yb to Er or Tm to Ho doping concentration as a tradeoff for a longer fiber length (e.g., more than ten centimeters).

U.S. Pat. No. 5,533,163 and the references cited therein provide a good tutorial on clad pumped fiber lasers, all of which are incorporated herein by reference along with the aforementioned patents and articles.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A single core, single mode clad-pumped fiber laser, comprising:

a core fiber having as a lasing ion either Erbium or Holmium codoped with a stimulating ion of either Ytterbium or Thulium, respectively, in a concentration of the stimulating ion of at least ten times the concentration of the lasing ion, said core surrounded by inner, pump cladding having a polygon cross sectional area at least one thousand times greater than the cross sectional area of said core; and a pair of mirrors disposed at opposite ends of said core and spaced to resonate radiation at a selected wavelength within the band of laser level transitions of Erbium or Holmium, respectively.

2. A laser according to claim 1 wherein said wavelength is selected to provide a cross section of emission which is between 1.4 and 1.5 the cross section of cladding absorption.

3. A laser according to claim 1 wherein said concentration ratio is at least 12:1.

4. A laser according to claim 1 wherein said core has a diameter of about seven microns.

5. A laser according to claim 1 wherein the cross sectional area of said cladding is about $2(10)^3$ the cross sectional area of said core.

6. A laser according to claim 1 wherein said inner cladding has a cross sectional area of about $10^{-7}$ square meters.

7. A laser according to claim 1 wherein said cladding has a square cross section.

8. A laser according to claim 7 wherein said cladding is about 300 microns by about 300 microns.

9. A multi-core, clad-pumped, codoped fiber laser, comprising:

a plurality of cores disposed within pump cladding, each core doped with a rare earth lasing ion, said cores arranged in an isometric array with the center of each core being the same distance from the center of each other core adjacent thereto, thereby to prevent any of said cores from having radiation out of phase with radiation in any other of said cores, each core having substantially the same diameter as each other core, each core surrounded by cladding of a thickness at least equal to the diameter of said cores so that the center of each core is separated from the center of each other core adjacent thereto by at least twice the diameter of said cores, thereby providing a path for pump radiation in said cladding to be absorbed directly by all of said cores in substantially equal amounts; and a pair of mirrors disposed on opposite ends of said cores and forming a single laser cavity having a finesse of at least ten, thereby to cause radiation in said cores to become phase-locked, whereby to provide output power in a single bright beam of the fundamental supermode.

10. A laser according to claim 9 wherein the center-to-center spacing of said cores is on the order of twelve to sixteen microns.

11. A laser according to claim 9 wherein the radiation in said cavity is frequency locked to 5 MHz or less.

12. A laser according to claim 9 wherein each core is doped with a lasing ion, Erbium or Holmium, and codoped with either Ytterbium or Thulium, respectively, of a concentration at least ten times the concentration of the corresponding lasing ion.

13. A laser according to claim 9 wherein said cores have a diameter of between three and eight microns.

14. A laser according to claim 13 wherein the center-to-center spacing of said cores is on the order of twelve to sixteen microns.

15. A laser according to claim 9 having seven cores of about seven microns diameter.

16. A laser according to claim 15 wherein the center-to-center spacing of said cores is on the order of twelve to sixteen microns.

17. A laser according to claim 9 having 37 cores of between three and six microns in diameter.

18. A laser according to claim 17 wherein the center-to-center spacing of said cores is on the order of twelve to sixteen microns.

19. A method of forming a multi-core, clad pumped laser, comprising:

providing preform rods, each having a core doped with a rare earth ion and each having pump cladding surrounding said core;

machining said rods to provide a hexagonal cross section with the least dimension thickness of said cladding being not less than twice the radius of said core;

cutting said rods into shorter pieces;

arranging said pieces in isometric matrices of contiguous pieces, each including a center piece and at least one ring of pieces in contact surrounding said center piece;

fusing said matrices into solid core preforms;

forming additional pump cladding material around said core preforms to provide laser preforms;

precision-machining said additional pump cladding material into a surface of predetermined geometric shape;

drawing a long length, multicore, cladded fiber of predetermined dimensions from said fiber preform;

forming outer cladding material around said additional pump cladding material; and providing a protective coating over said outer cladding material to provide a laser fiber.

20. A method according to claim 19 wherein each core is doped with either Erbium or Holmium, respectively, as a lasing ion and codoped with either Ytterbium or Thulium in a concentration which is at least ten times the concentration of said lasing ion.

* * * * *